United States Patent
Bruhn

(10) Patent No.: US 6,256,487 B1
(45) Date of Patent: Jul. 3, 2001

(54) MULTIPLE MODE TRANSMITTER USING MULTIPLE SPEECH/CHANNEL CODING MODES WHEREIN THE CODING MODE IS CONVEYED TO THE RECEIVER WITH THE TRANSMITTED SIGNAL

(75) Inventor: Stefan Bruhn, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/145,333

(22) Filed: Sep. 1, 1998

(51) Int. Cl.[7] ..................................................... H04B 1/06
(52) U.S. Cl. ............................................ 455/352; 455/418
(58) Field of Search ................................ 455/70, 72, 352, 455/68, 418, 419, 552, 553

(56) References Cited

U.S. PATENT DOCUMENTS

| | | | |
|---|---|---|---|
| 3,815,028 | * 6/1974 | Rabow | 325/304 |
| 4,020,461 | * 4/1977 | Adams | 340/146.1 |
| 5,502,713 | 3/1996 | Lagerqvist et al. | |
| 5,930,706 | * 7/1999 | Raith | 455/422 |
| 5,982,766 | * 11/1999 | Nystrom | 370/347 |
| 5,991,642 | * 11/1999 | Watanabe | 455/560 |

FOREIGN PATENT DOCUMENTS

| | | |
|---|---|---|
| WO97/15131 | 4/1997 | (WO) . |
| WO98/00984 | 1/1998 | (WO) . |

OTHER PUBLICATIONS

Fingscheidt, Tim et al., "Robust Speech Decoding: A Universal Approach to Bit Error Concealment." 1997 IEEE, pp. 1667–1670.

Fingscheidt, Tim et al., "Robust GSM Speech Decoding Using the Channel Decoder's Soft Output." ESCA, Eurospeech 97, Rhodes, Greece, pp. 1315–1318.

"Digital cellular telecommunications system; Comfort noise aspects of Enhanced Full Rate (EFR) speech traffic channels (GSM 06.62)." European Telecommunications Standards Institute, Nov. 1996, Reference: DE/SMG–020662, pp. 1–19.

European Search Report re RS 101682 Date of mailing of search: Mar. 8, 1999.

J. E. Kleider et al., "An Adaptive–Rate Digital Communication System for Speech", 1997 IEEE International Conference on Acoustics, Speech, and Signal Processing, vol., 3, pp. 1695–1698 (Apr. 21–24, 1997).

J. E. Kleider et al., "An adaptive–Rate Anti–Jam System for Optimal Voice Communication", Milcom 97 Conference Record, vol., 3, pp. 1103–1107 (Nov. 2–5, 1997).

* cited by examiner

Primary Examiner—Daniel Hunter
Assistant Examiner—Nick Corsaro
(74) Attorney, Agent, or Firm—Burns, Doane, Swecker & Mathis, L.L.P.

(57) ABSTRACT

A communication system supports multiple source coding/channel coding schemes. A mode indicator can be transmitted with payload data to inform the receiver of the particular scheme currently being employed. The mode indicator may be encoded using a relatively weak channel coding to minimize extraneous overhead transmissions. To enhance the likelihood of successfully decoding the mode indicator, which has information that is highly important in successfully decoding the payload data, various value likelihood parameters can be calculated and combined to identify a most likely mode. Included in the likelihood parameters is one parameter which can be calculated based on a model of the mode information's likely value.

47 Claims, 5 Drawing Sheets

MULTIPLE MODE TRANSMITTER USING MULTIPLE SPEECH/CHANNEL CODING MODES WHEREIN THE CODING MODE IS CONVEYED TO THE RECEIVER WITH THE TRANSMITTED SIGNAL

BACKGROUND

The present invention generally relates to mode handling in the field of communication systems and, more particularly, to determining coding modes in digital communication systems that support multiple speech/forward error correction coding schemes.

The growth of commercial communication systems and, in particular, the explosive growth of cellular radiotelephone systems, have compelled system designers to search for ways to increase system capacity without reducing communication quality beyond consumer tolerance thresholds. One technique to achieve these objectives involved changing from systems wherein analog modulation was used to impress data onto a carrier wave, to systems wherein digital modulation was used to impress the data on carrier waves.

In wireless digital communication systems, standardized air interfaces specify most of the system parameters, including speech coding type(s), burst format, communication protocol, etc. For example, the European Telecommunication Standard Institute (ETSI) has specified a Global System for Mobile Communications (GSM) standard that uses time division multiple access (TDMA) to communicate control, voice and data information over radio frequency (RF) physical channels or links using a Gaussian Minimum Shift Keying (GMSK) modulation scheme at a symbol rate of 271 ksps. In the U.S., the Telecommunication Industry Association (TIA) has published a number of Interim Standards, such as IS-54 and IS-136, that define various versions of digital advanced mobile phone service (D-AMPS), a TDMA system that uses a differential quadrature phase shift keying (DQPSK) modulation scheme for communicating data over RF links.

TDMA systems subdivide the available frequency into one or more RF channels. The RF channels are further divided into a number of physical channels corresponding to timeslots in TDMA frames. Logical channels are formed of one or several physical channels where modulation and coding is specified. In these systems, the mobile stations communicate with a plurality of scattered base stations by transmitting and receiving bursts of digital information over uplink and downlink RF channels.

The growing number of mobile stations in use today has generated the need for more voice and data channels within cellular telecommunication systems. As a result, base stations have become more closely spaced, with an increase in interference between mobile stations operating on the same frequency in neighboring or closely spaced cells. In fact, some systems now employ code division multiple access (CDMA), using a form of spread spectrum modulation wherein signals intentionally share the same time and frequency. Although digital techniques provide a greater number of useful channels from a given frequency spectrum, there still remains a need to maintain interference at acceptable levels, or more specifically to monitor and control the ratio of the carrier signal strength to interference, (i.e., carrier-to-interference (C/I) ratio).

Another factor which is increasingly important in providing various communication services is the desired/required user bit rate for data to be transmitted over a particular connection. For example, for voice and/or data services, user bit rate corresponds to voice quality and/or data throughput, with a higher user bit rate producing better voice quality and/or higher data throughput. The total user bit rate is determined by a selected combination of techniques for speech coding, channel coding, modulation, and resource allocation, e.g., for a TDMA system, this latter technique may refer to the number of assignable time slots per connection, for a CDMA system, this latter parameter may refer to the number of assignable codes per connection.

Speech coding (or more generally "source coding") techniques are used to compress the input information into a format which uses an acceptable amount of bandwidth but from which an intelligible output signal can be reproduced. Many different types of speech coding algorithms exist, e.g., residual excited linear predictive (RELP), regular-pulse excitation (RPE), etc., the details of which are not particularly relevant to this invention. More significant in this context is the fact that various speech coders have various output bit rates and that, as one would expect, speech coders having a higher output bit rate tend to provide greater consumer acceptance of their reproduced voice quality than those having a lower output bit rate. As an example, consider that more traditional, wire-based telephone systems use PCM speech coding at 64 kbps, while GSM systems employ an RPE speech coding scheme operating at 13 kbps.

In addition to speech coding, digital communication systems also employ various techniques to handle erroneously received information. Generally speaking, these techniques include those which aid a receiver to correct the erroneously received information, e.g., forward error correction (FEC) techniques, and those which enable the erroneously received information to be retransmitted to the receiver, e.g., automatic retransmission request (ARQ) techniques. FEC techniques include, for example, convolutional or block coding (collectively referred to herein as "channel coding") of the data prior to modulation. Channel coding involves representing a certain number of data bits using a certain number of code bits. Thus, for example, it is common to refer to convolutional codes by their code rates, e.g., ½ and ⅓, wherein the lower code rates provide greater error protection but lower user bit rates for a given channel bit rate.

Conventionally, each of the techniques which impacted the user bit rate were fixed for any given radiocommunication system, or at least for the duration of a connection established by a radiocommunication system. That is, each system established connections that operated with one type of speech coding, one type of channel coding, one type of modulation and one resource allocation. More recently, however, dynamic adaptation of these techniques has become a popular method for optimizing system performance in the face of the numerous parameters which may vary rapidly over time, e.g., the radio propagation characteristics of radiocommunication channels, the loading of the system, the user's bit rate requirements, etc.

For example, different modulations have been dynamically assigned to selectively take advantage of the strengths of individual modulation schemes and to provide greater user bit rates and/or increased resistance to noise and interference. An example of a communication system employing multiple modulation schemes is found in U.S. Pat. No. 5,577,087. Therein, a technique for switching between 16 QAM and QPSK is described. The decision to switch between modulation types is made based on quality measurements, however this system employs a constant user bit rate which means that a change in modulation scheme also requires a change in channel bit rate, e.g., the number of timeslots used to support a transmission channel.

It is envisioned that many different combinations of these processing techniques may be selectively employed both as between different connections supported by a radiocommunication system and during the lifetime of a single connection. However, the receiver must be aware of the types of processing being used by the transmitter in order to properly decode the information upon receipt. Generally, there are two categories of techniques for informing a receiver about processing techniques associated with a radio signal: (1) explicit information, i.e., a message field within the transmitted information having a mode value that is indicative of the processing type(s) and (2) implicit information, which is sometimes referred to as "blind" decoding, whereupon the receiver determines the processing performed by the transmitter by analyzing the received signal. This latter technique is employed in CDMA systems operating in accordance with the TIA/EIA IS-95 standard. Explicit information is sometimes considered to be preferable because it reduces processing delay at the receiver, but comes at the cost of the need for the transmitter to include additional overhead bits along with the user data.

Of particular interest for the present invention are mode indicators which reflect the transmitter's currently employed speech coding/channel coding combination. For example, when channel conditions are good, the transmitter may employ a speech coding/channel coding mode which provides for a high source coding bit rate and a relatively low degree of error protection. Alternatively, when channel conditions are poor, then a coding mode which provides a low bit rate speech coding technique coupled with a relatively high degree of error protection may be employed. Systems can rapidly change between these different coding modes based upon varying changes in channel conditions.

As mentioned above, a mode indicator may be transmitted to the receiver (whether it be the base or mobile station's receiver) so that it can employ the appropriate channel decoding/speech decoding techniques. Typically, this mode indicator may include just a few, e.g., two, bits which are conveyed along with the data fields. Thus, it will be appreciated that it is particularly important for the receiver to be able to accurately decode the coding mode indicator since, otherwise, an entire frame of data may be unrecoverable. This desire for accurate reception of the mode indicator may lead designers to strongly protect the mode indicator with heavy channel coding.

However, usage of heavy channel coding implies higher redundancy, which means more bits to be transmitted for the mode indicator field. This is, as explained earlier, undesirable since overhead bits should be minimized, not increased. Thus, it would be desirable to provide techniques and systems for increasing the likelihood that mode indicators, such as the coding mode indicator, will be properly decoded, while at the same time minimizing the number of overhead bits which are transmitted with the payload data.

SUMMARY

These and other drawbacks and limitations of conventional methods and systems for communicating information are overcome according to the present invention, wherein relatively weak channel coding (e.g., convolutional coding or block coding) are used to protect mode information transmitted over the air interface. In this way, overhead bit transmission is minimized, thereby maximizing user data throughput for a given resource allocation. The mode information may comprise, for example, a mode indicator which informs a receiver of the combination of speech coding/channel coding currently used to encode the payload data, a mode request which informs a transmitter of a particular codec mode desired by a receiver for subsequently transmitted information blocks or frames and/or channel measurement information, which acts as an implicit request for a particular codec mode to be provided by the transmitter.

In order to compensate for the relatively weak channel coding used to protect the mode information, exemplary embodiments of the present invention enhance accurate decoding of the mode information by providing a plurality of estimated or calculated likelihood parameters which are combined to maximize a probability of correctly determining the value of the mode information. For example, a first likelihood parameter can be derived from soft information which is available as part of the decoding of the mode information field, e.g., in a Viterbi decoding process. A second likelihood parameter can be derived from a model created specifically to use a priori knowledge of the mode information itself. These two likelihood parameters can be combined to identify the (most likely) current mode information.

BRIEF DESCRIPTION OF THE DRAWINGS

These and other objects, features and advantages of the present invention will become more apparent upon reading from the following detailed description, taken in conjunction with the accompanying drawings, wherein.

DETAILED DESCRIPTION

The following exemplary embodiments are provided in the context of TDMA radiocommunication systems. However, those skilled in the art will appreciate that this access methodology is merely used for the purposes of illustration and that the present invention is readily applicable to all types of access methodologies including frequency division multiple access (FDMA), TDMA, code division multiple access (CDMA) and hybrids thereof.

Moreover, operation in accordance with GSM communication systems is described in European Telecommunication Standard Institute (ETSI) documents ETS 300 573, ETS 300 574 and ETS 300 578, which are hereby incorporated by reference. Therefore, the operation of the GSM system is only described herein to the extent necessary for understanding the present invention. Although, the present invention is described in terms of exemplary embodiments in a GSM system, those skilled in the art will appreciate that the present invention could be used in a wide variety of other digital communication systems, such as those based on PDC or D-AMPS standards and enhancements thereof.

Figure 1:
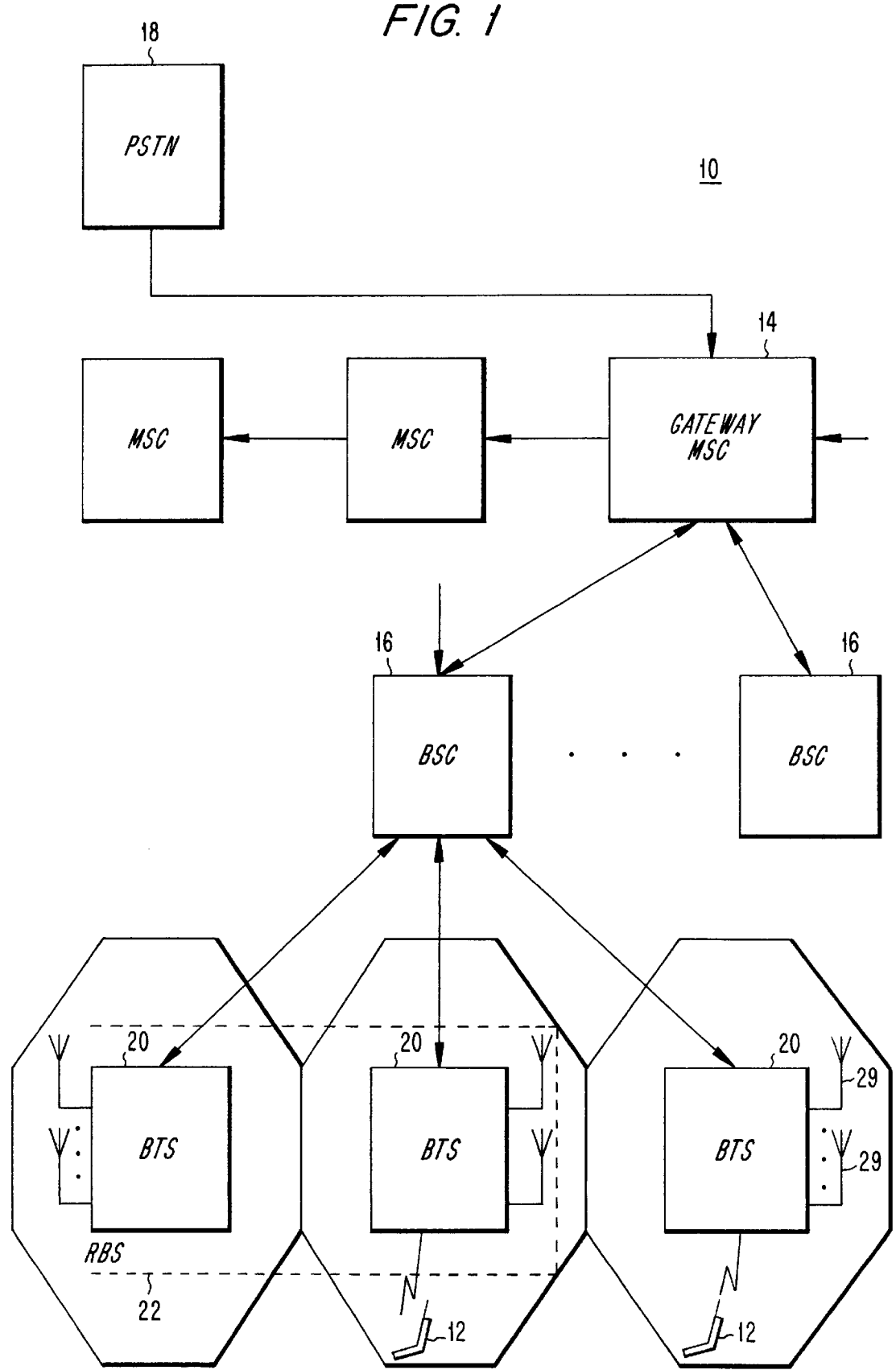
FIG. 1 is a block diagram of an exemplary GSM communication system which advantageously uses the present invention.

Referring to FIG. 1, a communication system 10 according to an exemplary embodiment of the present invention is depicted. The system 10 is designed as a hierarchical network with multiple levels for managing calls. Using a set of uplink and downlink frequencies, mobile stations 12 operating within the system 10 participate in calls using time slots allocated to them on these frequencies. At an upper hierarchical level, a group of Mobile Switching Centers (MSCs) 14 are responsible for the routing of calls from an originator to a destination. In particular, these entities are responsible for setup, control and termination of calls. One of the MSCs 14, known as the gateway MSC, handles communication with a Public Switched Telephone Network (PSTN) 18, or other public and private networks.

At a lower hierarchical level, each of the MSCs 14 are connected to a group of base station controllers (BSCs) 16. Under the GSM standard, the BSC 16 communicates with a MSC 14 under a standard interface known as the A-interface, which is based on the Mobile Application Part of CCITT Signaling System No. 7.

At a still lower hierarchical level, each of the BSCs 16 controls a group of base transceiver stations (BTSs) 20. Each BTS 20 includes a number of TRXs (not shown) that use the uplink and downlink RF channels to serve a particular common geographical area, such as one or more communication cells 21. The BTSs 20 primarily provide the RF links for the transmission and reception of data bursts to and from the mobile stations 12 within their designated cell. In an exemplary embodiment, a number of BTSs 20 are incorporated into a radio base station (RBS) 22. The RBS 22 may be, for example, configured according to a family of RBS-2000 products, which products are offered by Telefonaktiebolaget L M Ericsson, the assignee of the present invention. For more details regarding exemplary mobile station 12 and RBS 22 implementations, the interested reader is referred to U.S. patent application Ser. No. 08/921,319, entitled "A Link Adaptation Method For Links using Modulation Schemes That Have Different Symbol Rates", to Magnus Frodigh et al., and filed on Aug. 29, 1997, the disclosure of which is expressly incorporated here by reference.

According to exemplary embodiments of the present invention, information transmitted between a BTS 20 and a mobile station 12 can be processed according using different codec modes. The phrase "codec mode" as it is used herein refers to a combination of source coding (e.g., speech coding) and channel coding, although the present invention is also applicable to the transmission and reception of other types of mode indicators and, even more generally, to the transmission and reception of other information over an air interface. To more fully understand the exemplary modes for which indicators, requests and information associated therewith can be protected, transmitted and decoded, consider the exemplary GSM codec mode illustrated in FIGS. 2(a) and 2(b).

Figure 2A:
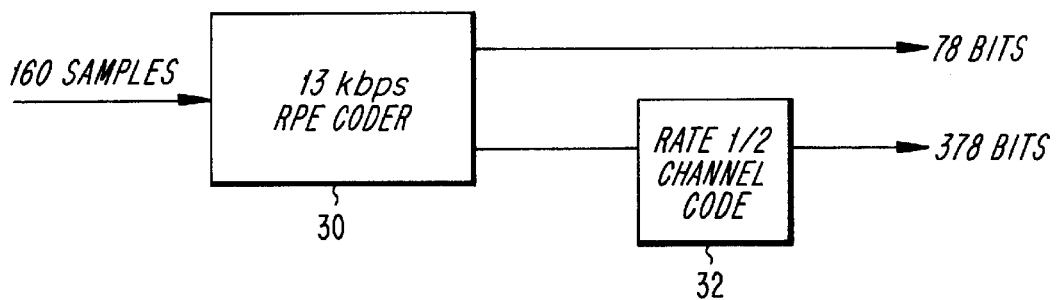
FIG. 2(a) depicts a codec mode used in a conventional GSM system.
Figure 2B:
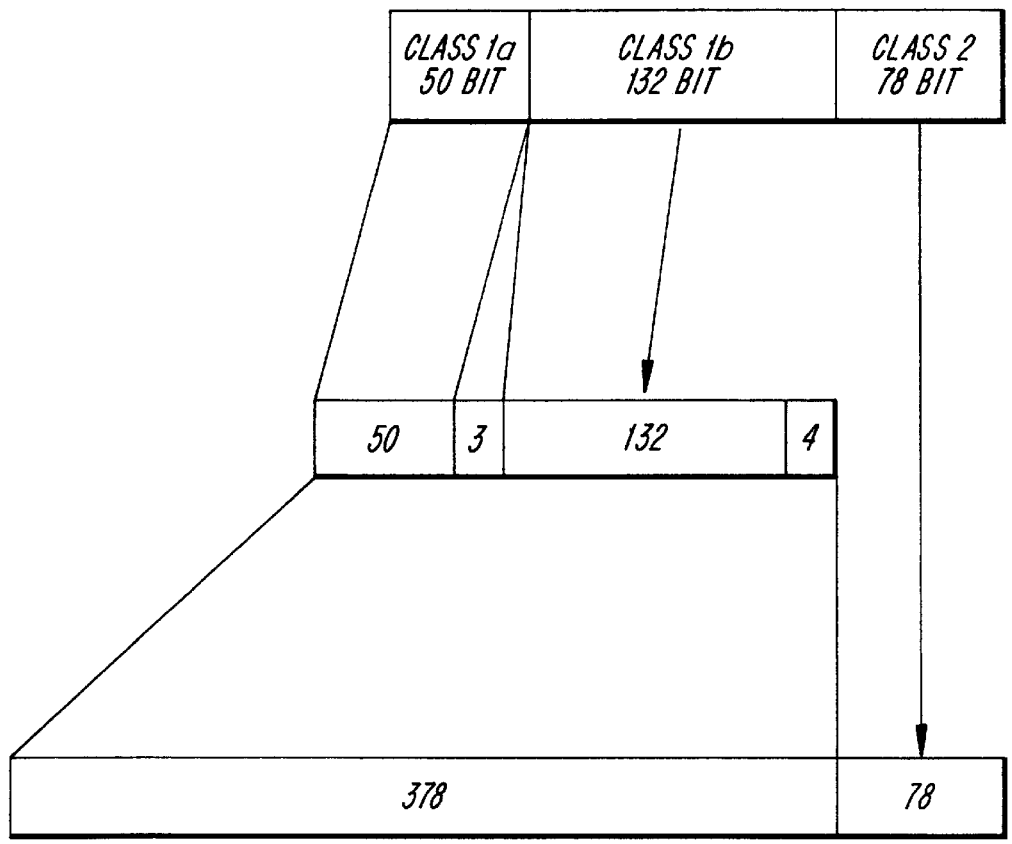
FIG. 2(b) depicts a conventional mapping of bits in a speech frame for unequal error protection coding.

FIG. 2(a) depicts a portion of the transmit signal processing path downstream of the A/D converter (not shown) which digitizes an exemplary input audio signal. A block of 160 samples is presented to an RPE speech coder 30 which operates in accordance with the well known GSM specifications (e.g., GSM 06.53) to produce two categories of output bits, 182 class 1 bits and 78 class 2 bits, for a total output bit rate of 13 kbps. As seen in FIG. 2(b), the class 1 bits are further divided into class 1a bits and class 1b bits, both of which are input to a channel coder 32, which performs rate ½ convolutional encoding. This resulting in an output of 378 bits from the channel coder 32, including 3 parity bits associated with the class 1a bits and four tail bits associated with the class 1b bits. This composite process can be considered to be one example of a single codec mode.

However, Applicants envision future systems that provide for a plurality of different codec modes. For example, as conceptually illustrated in FIG. 3(a), there may be two different speech coders and two different channel coders which can be used in various combinations to encode bits prior to transmission. A first speech coder 40 may operate to process digital samples and provide an output bit rate of X kbps, while a second speech coder 42 may process the input digital samples to provide an output bit rate of Y kbps, where X>Y. Similarly, two different channel coders 44 and 46 (in this example convolutional coders, although one or both could alternatively be block coders) provide different degrees of error protection by virtue of their different rates 1/A and 1/B, respectively, where A>B. Thus, it can be seen that by using mode control processor 48 in conjunction with multiplexors 50 and 52 to select a path, i.e., a combination of speech coder and channel coder for this example, for processing a particular block or frame of payload data, four different codec modes are available.

Many other techniques are, of course, available to create multiple codec modes in a transmitter. Consider the example in FIG. 3(b), wherein a plurality of source (e.g., speech) coders 60, 62, 64, and 66 are provided in selectable transmit signal processing paths. Each coder has a different output rate (X>Y>Z>A kbps) and is associated with a different one of the channel coders 68, 70, 72 and 74. To provide a uniform output data rate of F kbps as between the different, selectable paths (which may be desirable for similar resource allocation/connection), the channel coders may be designed so that the amount of redundancy added to the source coded data stream is higher for the lower bit rate source coder and lower for the higher bit rate source coders. As in the earlier example, the particular codec mode selected for any given data block or frame is controllable by, for example, a mode control processor 76 and multiplexor 78.

Figure 3A:
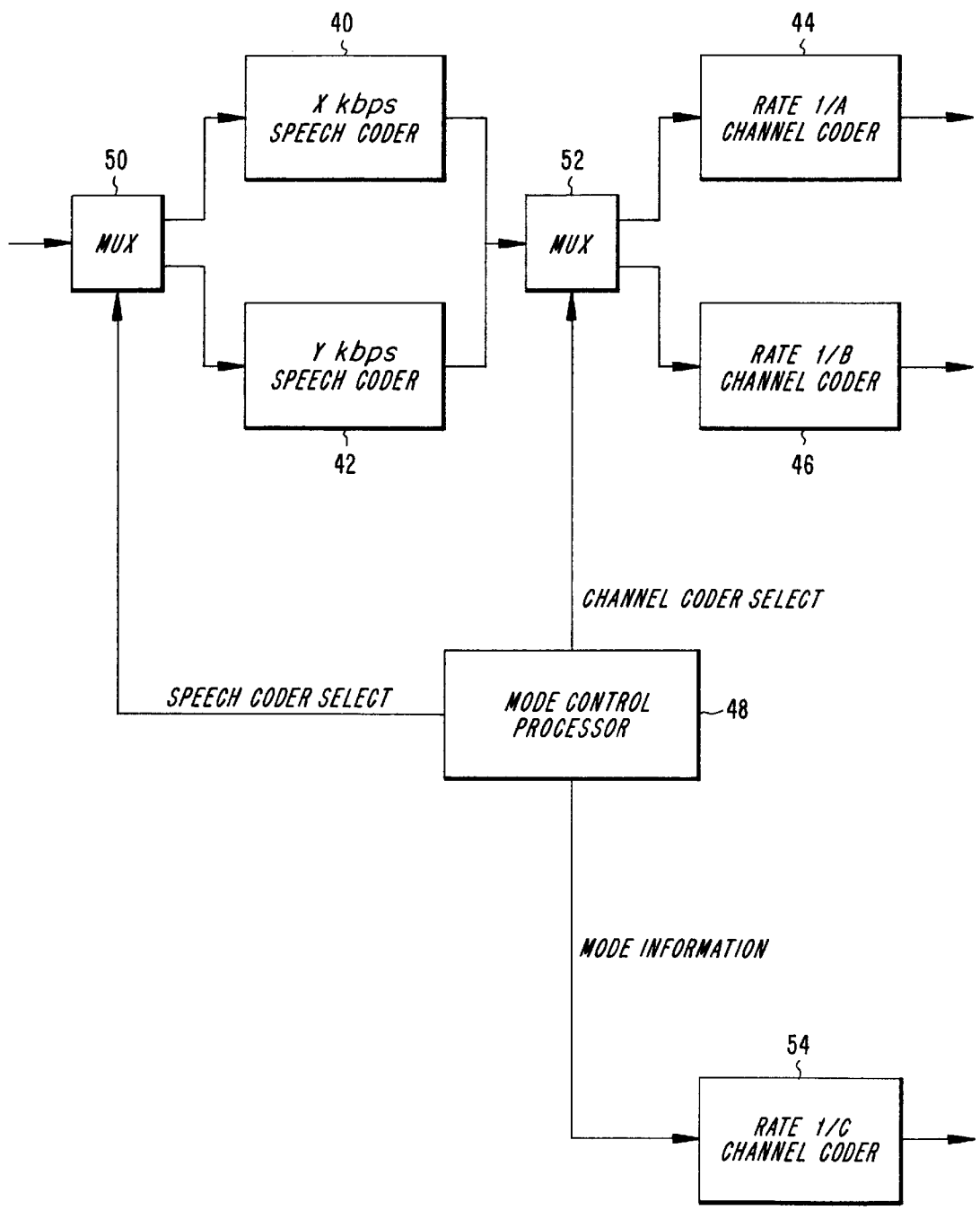
FIG. 3(a) is a block diagram illustrating multiple codec modes, individual ones of which can be selected for processing data to be transmitted and a correspoding mode indicator according to an exemplary embodiment of the present invention.
Figure 3B:
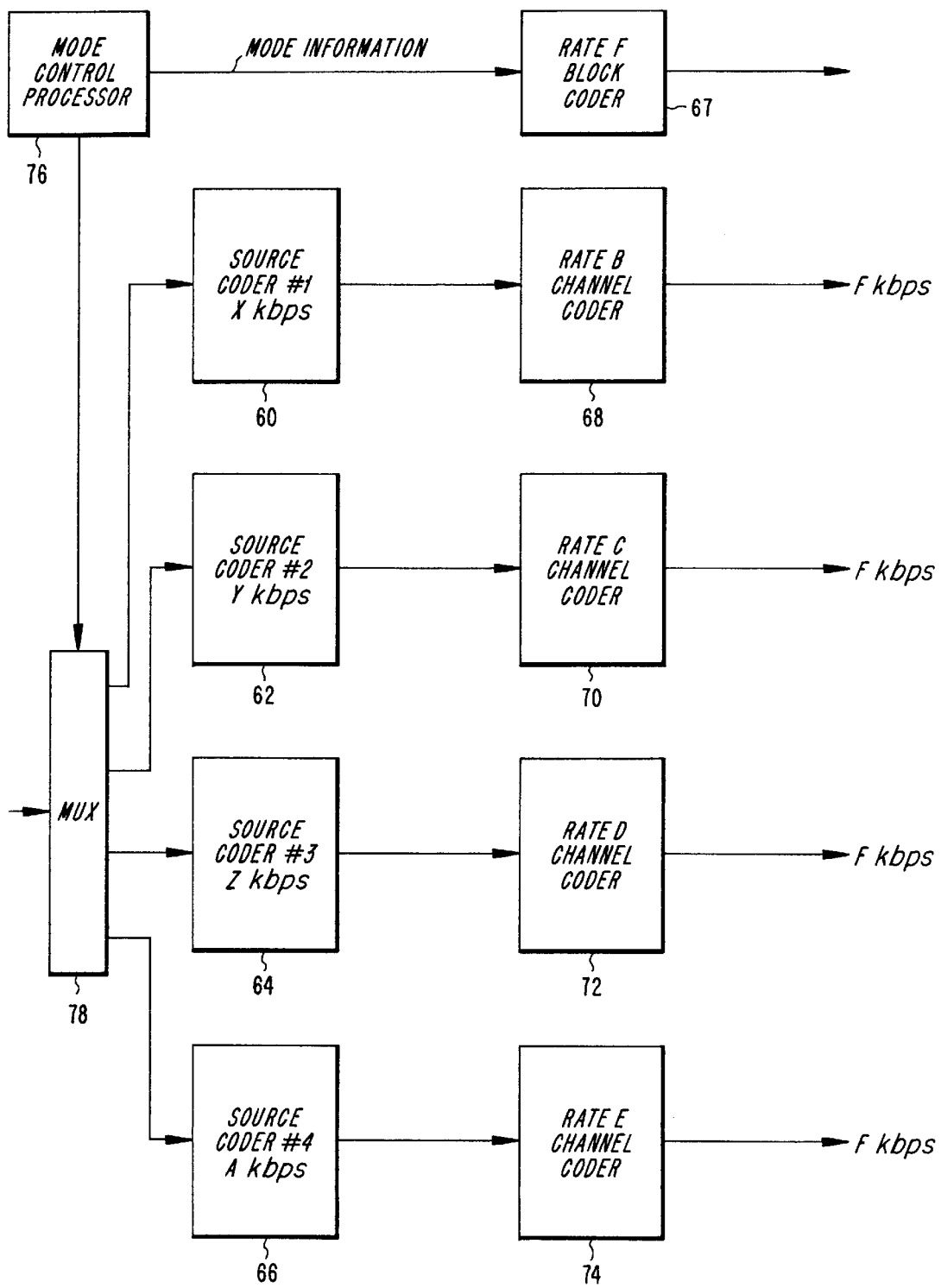
FIG. 3(b) is another block diagram illustrating another exemplary technique for generating multiple codec modes.

Regardless of the technique used at the transmit side to provide different codec modes, in order to be able to correctly decode the received data, a receiver will need to know the codec mode used by the transmitter to process any given block or frame of received data. According to exemplary embodiments of the present invention, this can be accomplished by transmitting a mode indicator from the transmitter to the receiver in conjunction with, or in advance of, the block or frame of data to which it relates. In the example of FIGS. 3(a) and 3(b), a two bit mode indicator field would suffice to inform the receiver of the combination of speech coder and channel coder used to process data prior to transmission. Alternatively, the receiver may transmit a request for a particular codec mode to the transmitter or the receiver may transmit signal quality measurements associated with the downlink channel (i.e., BTS to mobile station link) to the transmitter which the transmitter then uses to identify an appropriate codec mode. In any of these three cases, some type of mode information is exchanged between the transmitter and the receiver over the air interface, which phrase is used to include each of these three specific examples, as well as other types of mode information.

In any event, since the mode information is also communicated over the air interface between the BTS 20 and the mobile station 12, it should also be protected against channel errors as well as the data. However, since the mode information may be conveyed over the air interface using only a few bits per frame, efficient (i.e., redundancy reducing) source coding with low delay is not feasible. Moreover, adding heavy channel coding, i.e., with a large amount of redundancy, is not desirable since it adds further to overhead (i.e., non-payload data) transmissions and reduces the user's effective bit rate. It is also desirable to maintain low coding delay so that codec modes can be changed quickly to account for rapid changes in transmission channel conditions. According to exemplary embodiments of the present invention, therefore, the mode information is channel coded using a relatively weak (i.e., with a small amount of redundancy) channel code. In FIG. 3(a), this is exemplified by channel coder 54 which employs a rate 1/C convolutional code. In FIG. 3(b), this is exemplified by a block coder 67 employing (8,2) block coding. More specific, but merely illustrative, examples of relatively weak channel coding for the mode indicator are rate ⅓ to ½ (or greater) convolutional coding and (4,2) to (8,2) block coding (where, in each instance, the first number within the parentheses is the number of gross bits and the second number is the number of net bits).

Figure 4:
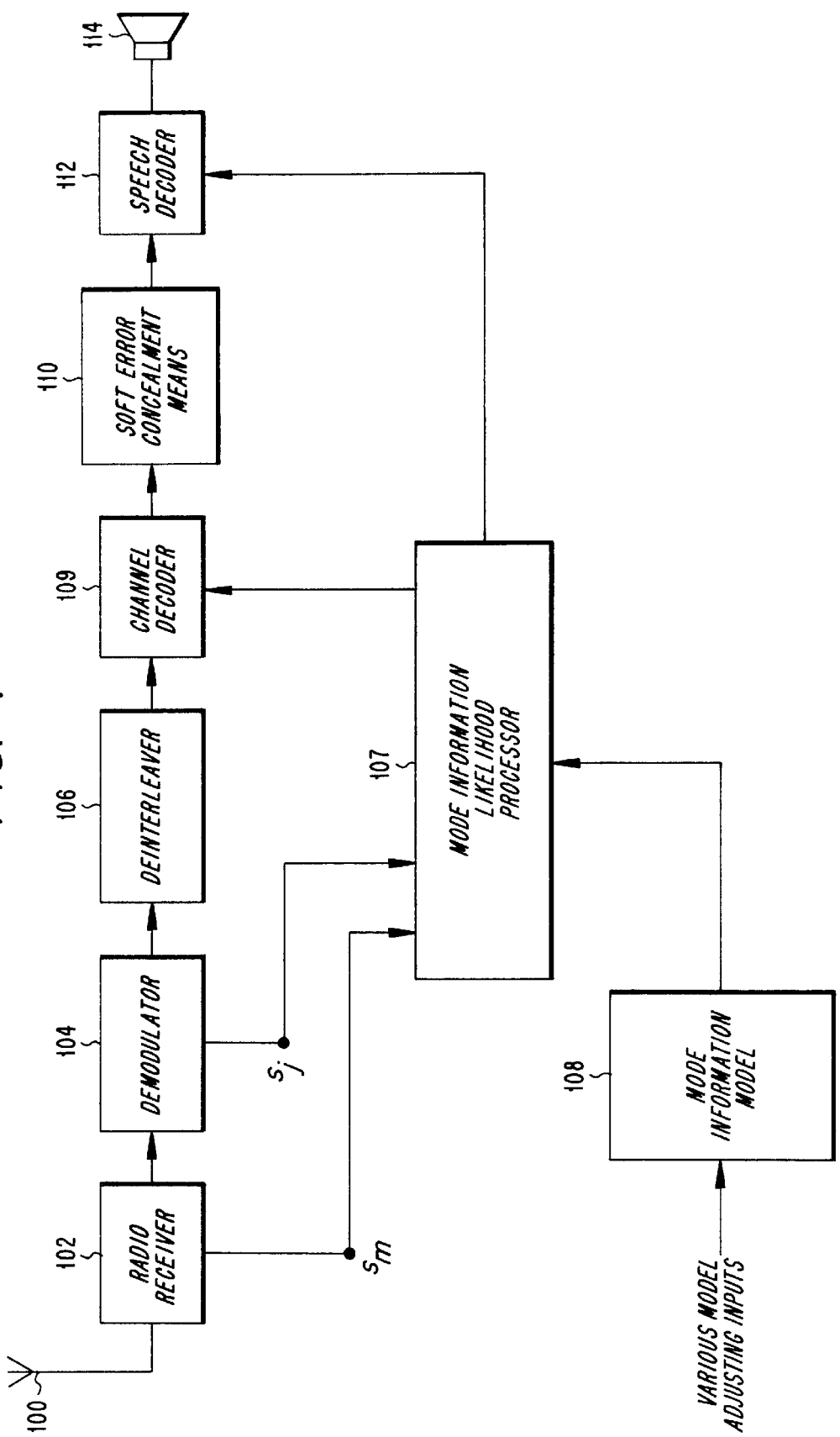
FIG. 4 depicts a block diagram of a receiver including a mode likelihood processor and a mode information model according to an exemplary embodiment of the present invention.

In order to properly decode, at the receiver side, the mode information which is conveyed over the air interface using a relatively weak form of channel coding, exemplary embodiments of the present invention also employ composite likelihood or probability calculations to aid in properly decoding the mode information as illustrated in FIG. 4. Therein, an antenna 100 of the receiver apparatus, for instance, receives radio signals over a certain radio channel. The signals (e.g., data/speech messages) transmitted over this channel may become strongly distorted, for, instance due to fading, so that the TDMA-bursts give rise to a highly distorted speech frame.

Demodulation takes place in the radio receiver 102 at a given radio frequency (in the GSM-system 865–935 MHZ) in a known manner, so as to obtain a baseband modulated signal. The signal strength level(s) of the radio signals incoming to the radio receiver 102 can be measured and are referenced $S_m$ in FIG. 4. The baseband modulated signal is demodulated in the demodulator 104 within the IF-range, this demodulator also including an equalizer for compensating or correcting the multipath propagation to which the incoming signal has been subjected during transmission, in a known manner. For example, the well known Viterbi equalizer can be used for this purpose.

So-called soft information associated with the likelihood of any given symbol estimate is obtained from the Viterbi equalizer in the demodulator 104, this soft information being referenced $S_j$ in FIG. 4. A deinterleaver 106 is connected downstream of the demodulator/equalizer 104 and recovers the time divided bursts intended for the receiver, in a known manner.

The receiver also includes a mode information likelihood processor 107 that calculates a composite likelihood associated with the value of the mode information and provides an output to the channel decoder 109 and the speech decoder 112, indicating the techniques identified by the receiver as those which have most likely been used by the transmitter to initially process the received data block or frame. The composite likelihood includes, for example, a first likelihood parameter associated with soft information $S_j$ generated during the demodulating process of the mode information and a second likelihood parameter generated by a probability or likelihood model(s) 108.

The first likelihood parameter can be a metric calculated in conjunction with, for example, Viterbi decoding of the mode information. For each potential mode information value (e.g., 00, 01, 10, 11 in the foregoing four codec mode example) the demodulating process can provide a first likelihood parameter. Similarly, the model 108 can also provide a second likelihood parameter value for each potential value of the mode information. The first and second likelihood parameter values associated with each potential value of the mode information can be combined, e.g., multiplied together, to generate a composite likelihood for each potential value of the mode information and the highest probability or likelihood can be selected for usage by the channel decoder 109 and the speech decoder 112.

The model employed in block 108 can vary depending upon various system considerations. For example, Markov models can be used as probability models for the mode information. Markov models are, per se, well known in the art and, therefore, are not further described here. However, the interested reader may obtain additional information regarding Markov models generally, and their usage in providing estimates of symbol values, in articles such as "Robust Speech Dedcoding: A Universal approach to Bit Error Concealment", authored by Fingscheidt et al. and found in the Proceedings of ICASSP'97, Munich, Germany, as well as "Robust GSM Speech Decoding Using the Channel Decoder's Soft Output", authored by Fingscheidt et al. and found in the Proceedings of Eurospeech '97, Rhodes, Greece, the disclosures of both articles being expressly incorporated here by reference.

For example, a Markov model of order 0 is suitable for usage as mode information model 108 if the codec mode code words are not identically distributed, i.e., if all of the possible codec modes are not equally likely to be used for a given data block or frame of interest. More specifically, a Markov model of order 0 is usable for the mode information model 108 when a priori temporal knowledge does not influence the likelihood of a particular codec mode. For example, if a certain data block or frame is received at time n-1 which has been processed with mode 1 and if this knowledge does not alter the relative likelihood of which codec mode will be used by the transmitter to process the next data block or frame, then a Markov model of order 0 would be a suitable choice for the model 108.

If, on the other hand, the codec mode used at time n-1 does influence the probability of one or more codec modes being used at a subsequent time instant, then a Markov model of order 1 is suitable for the mode information model 108 to model unequal transition probabilities from the preceding codec mode code word to the current. The transition probabilities of the first order model can, for example, be set according to the following rules:

Since mode changes are seldom, the probability of switching from one codec mode to another are small compared to the probability of maintaining a current mode.

Mode changes may only occur to adjacent modes, e.g., if there were three different channel coding modes it might only be permissible to shift from a heaviest channel coding mode to a second heaviest channel coding mode, but not from the heaviest channel coding mode to the weakest channel coding mode. Thus, transition probabilities for modes which are not direct neighbors can be set to 0.

More than n mode changes per time interval of m frames may be prohibited. Transition probabilities to other modes than the current mode can then be set to 0 when the count n is exceeded within the time interval.

The entity sending a codec mode request has knowledge of the requested mode. Although there will be some delay until the request is granted by the receiving entity, and speech data is accordingly encoded using the new combination of source/channel coding and is transmitted along with the corresponding mode indication, the decoder can bias the transition probabilities of the Markov model for the mode information toward value representing the requested mode.

The channel conditions in uplink and downlink are correlated. Hence, it is likely that the codec mode request being received from the remote entity corresponds to the codec mode being sent to the remote entity. The transition probabilities of the Markov model for received codec mode request for the one radio link (e.g., downlink) can thus be biased towards the requested codec mode for the other link (e.g., uplink).

Those skilled in the art will appreciate that these are simply examples of probabilistic models which can be used to determine a likelihood of the mode information being a particular value for any given frame based on rules and past history.

Moreover, whichever model is selected may itself be adapted due to system configuration changes associated with other parameters, for example changes in:

the number of codec modes;
the resolution of link quality measurements;
the transmission rate of the codec mode information (e.g. for discontinuous transmission (DTX));
channel protection degree (i.e., amount of redundancy) of the codec mode information (e.g. for DTX)
channel coding scheme (e.g., convolutional or block coding)for the codec mode information (e.g. for DTX)
of the architectural concept (either symmetrical or centralized control) of the two-way communication system.

This latter adjustment parameter refers to symmetrical or centralized control architectures. Symmetrical control architectures refer to systems wherein there is no distinction between the uplink and downlink, i.e, the mobile station and base station are not distinguished. Thus, the transmitter for the link may control the selection of a mode. Alternatively, the mode requester, e.g., the receiver, in a link may control a mode (i.e., the mode request and/or measurements are binding upon the transmitter).

Centralized control architectures refer to scenarios where the system is the master and the remote device, e.g., mobile station, is the slave. In this context, the system may control the codec mode for both links, i.e., mode requests by the mobile station are not binding. Thus, the type of architecture may reflect the likelihood of a particular mode being used for a future data transmission, e.g., the certainty with which a mobile station knows that its mode request will be honored by the system.

Moreover, with respect to others of the above-described exemplary model adjustment paramters, those skilled in the art will recognize that during DTX one link is inactive and codec mode information is transmitted with a reduced rate. For example, while codec mode information is transmitted in every frame of the active link, over the inactive link codec mode information is transmitted less frequently, e.g., every sixth frame. It is thus likely that codec mode information changes more often (per transmission) for the inactive link. As a consequence, the transition probabilities of the first order Markov model have to be adjusted to account for DTX such that keeping a current codec mode is less likely, while changing modes is more likely. Another possible model change associated with DTX might recognize that there is more transmission capacity available in a frame when DTX is being employed, which in turn permits stronger error correction coding to be used to protect the mode information. In this latter case, when combining the first likelihood parameter (from the soft output channel decoding) with the second likelihood parameter (from the probability model), the first can be given more weight.

In any event, once a composite likelihood is calculated for each possible value of the mode information and the most likely codec mode is identified, this provides the information necessary for the channel decoder 109 and speech decoder 112 to operate using appropriate processing algorithms. For example, the main function of the channel decoder 109 is to perform the opposite to the operation performed by the channel coder on the transmitter side, i.e., to recover transmitted information from the known redundant bits and the known channel coding (e.g., a convolutional code). The decoded speech frames are delivered from the channel decoder 109 to the speech decoder 112 speech-frame by speech-frame, via a soft error concealment means 110. The soft error concealment means 110 is preferably a state machine that is implemented in software, and it is responsible for handling situations where, for example, a speech frame is erroneously decoded. A complete synthesis of received speech frames is effected at the speech decoder 112 in order to deliver speech signals to a sound reproduction unit 114 in the mobile station.

Although the invention has been described in detail with reference only to a few exemplary embodiments, those skilled in the art will appreciate that various modifications can be made without departing from the invention. Accordingly, the invention is defined only by the following claims which are intended to embrace all equivalents thereof.

What is claimed is:

1. A method for communicating mode information between a transmitter and a receiver in a communication system comprising the steps of:

providing at least two different codec modes for processing said information in said transmitter, wherein said mode information is associated with said at least two different codec modes;

coding, at said transmitter, said mode information with an error protection coding having a predetermined level of redundancy associated therewith;

transmitting said coded mode information over an air interface;

decoding, at said receiver, said coded mode information using a soft-output channel decoding process to generate a first likelihood parameter for each different potential value associated with said mode information;

evaluating, at said receiver, a likelihood model associated with said mode information to generate a second likelihood parameter for each different potential value associated with said mode information, and selecting one of said different potential values for said received mode information based on both said first and second likelihood parameters, wherein said step of selecting further comprises:

combining, at said receiver, said first and second likelihood parameters, and selecting said one of said different potential values having a highest combined likelihood.

2. The method of claim 1, wherein said step of coding further comprises the step of:

convolutionally coding said mode information.

3. The method of claim 2, wherein said step of convolutionally coding said mode information further comprises the step of:
   convolutionally coding said mode information at a rate greater than or equal to ⅓.

4. The method of claim 1, wherein said step of coding said mode information further comprises the step of:
   block coding said mode information.

5. The method of claim 4, wherein said step of block coding said mode information further comprises the step of:
   block coding said mode information using a (4,2) to (8,2) block code.

6. The method of claim 1, wherein said mode information is an indicator which identifies one of said at least two different codec modes being used to process data being transmitted by said transmitter.

7. The method of claim 1, wherein each of said at least two codec modes identify both a source coding technique and a channel coding technique.

8. The method of claim 1, wherein said mode information is a request for one of said at least two different codec modes.

9. The method of claim 1, wherein said mode information is channel measurement information which can be used by said receiver to determine an appropriate one of said at least two different code modes.

10. The method of claim 1, further comprising the step of:
    adjusting said likelihood model based on a change in a number of said at least two different codec modes.

11. The method of claim 1, further comprising the step of:
    adjusting said likelihood model based on a change in resolution of channel quality measurements associated with transmission of information over said air interface between said transmitter and said receiver.

12. The method of claim 1, further comprising the step of:
    adjusting said likelihood model based on a change of the mode information rate.

13. The method of claim 1, further comprising the step of:
    adjusting said likelihood model based on a change in said predetermined level of redundancy of said error protection coding.

14. The method of claim 1, further comprising the step of:
    adjusting said likelihood model based on a change in a coding scheme used for said mode information.

15. The method of claim 1, further comprising the step of:
    adjusting said likelihood model based on a change associated with discontinuous transmission.

16. The method of claim 1, wherein said communication system is a two-way communication system.

17. The method of claim 16, further comprising the step of:
    adjusting said likelihood model based on a change to an architecture of said two-way communication system.

18. The method of claim 1, wherein said communication system is a one-way communication system.

19. The method of claim 1, wherein said likelihood model is a Markov model of order zero having probabilities which reflect a distribution of said mode information.

20. The method of claim 1, wherein said likelihood model is a Markov model of order one having probabilities which reflect a transition of said mode information.

21. The method of claim 16, further comprising the step of:
    adjusting said likelihood model based on knowledge of a requested one of said at least two different codec modes.

22. The method of claim 16, further comprising the step of:
    adjusting said likelihood model for a link between said transmitter and said receiver based on knowledge of one of said at least two different codec modes which is currently employed in another link for transmitting information from said receiver to said transmitter.

23. A communication system including a transmitter and a receiver which communicate mode information therebetween comprising:
    means for providing at least two different codec modes for processing said information in said transmitter, wherein said mode information is associated with said at least two different codec modes;
    means for coding, at said transmitter, said mode information with an error protection coding having a predetermined level of redundancy associated therewith;
    means for transmitting said coded mode information over an air interface;
    means for decoding, at said receiver, said coded mode information using
    means for a soft-output channel decoding process to generate a first likelihood parameter for each different potential value associated with said mode information;
    means for evaluating, at said receiver, a likelihood model associated with said mode information to generate a second likelihood parameter for each different potential value associated with said mode information, and
    means for selecting one of said different potential values for said received mode information based on both said first and second likelihood parameters, wherein said means for selecting further comprises:
    means for combining, at said receiver, said first and second likelihood parameters, and
    means for selecting said one of said different potential values having a highest combined likelihood.

24. The system of 23, wherein said means for further comprises:
    means for convolutionally coding said mode information.

25. The system of claim 24, wherein said means for convolutionally coding said mode information further comprises:
    means for convolutionally coding said mode information at a rate greater than or equal to ⅓.

26. The system of claim 23, wherein said means for coding said mode information further comprises:
    means for block coding said mode information.

27. The system claim 26, wherein said means for block coding said mode information further comprises:
    block coding said mode information using a (4,2) to (8,2) block code.

28. The system of claim 23, wherein said mode information is an indicator which identifies one of said at least two different codec modes being used to process data being transmitted by said transmitter.

29. The system of claim 23, wherein each of said at least two codec modes identify both a source coding technique and a channel coding technique.

30. The system of claim 23, wherein said mode information is a request for one of said at least two different codec modes.

31. The system of claim 23, wherein said mode information is channel measurement information which can be used by said receiver to determine an appropriate one of said at least two different code modes.

32. The system of claim 23, further comprising:

means for adjusting said likelihood model based on a change in a number of said at least two different codec modes.

33. The system of claim 23, further comprising:

means for adjusting said likelihood model based on a change in resolution of channel quality measurements associated with transmission of information over said air interface between said transmitter and said receiver.

34. The system of claim 23, further comprising:

means for adjusting said likelihood model based on a change of a mode information rate.

35. The system of claim 23, further comprising:

means for adjusting said likelihood model based on a change in said predetermined level of redundancy of said error protection coding.

36. The system of claim 23, further comprising:

means for adjusting said likelihood model based on a change in a coding scheme used for said mode information.

37. The system of claim 23, further comprising:

means for adjusting said likelihood model based on a change associated with discontinuous transmission.

38. The system of claim 23, wherein said communication system is a two-way communication system.

39. The system of claim 38, further comprising:

means for adjusting said likelihood model based on a change to an architecture of said two-way communication system.

40. The system of claim 23, wherein said communication system is a one-way communication system.

41. The system of claim 23, wherein said likelihood model is a Markov model of order zero having probabilities which reflect a distribution of said mode information.

42. The system of claim 23, wherein said likelihood model is a Markov model of order one having probabilities which reflect a transition of said mode information.

43. The system of claim 38, further comprising:

means for adjusting said likelihood model based on knowledge of a requested one of said at least two different codec modes.

44. The system of claim 38, further comprising:

means for adjusting said likelihood model for a link between said transmitter and said receiver based on knowledge of one of said at least two different codec modes which is currently employed in another link for transmitting information from said receiver to said transmitter.

45. A method for decoding mode information comprising the steps of:

decoding said mode information to obtain a first likelihood parameter associated with a value of said mode information;

evaluating a likelihood model to obtain a second likelihood parameter associated with said value of said mode information; and selecting a final value for said mode information based on both said first and second likelihood parameters.

46. The method of claim 45, wherein said likelihood model is a Markov model of order zero having probabilities which reflect a distribution of said mode information.

47. The method of claim 45, wherein said likelihood model is a Markov model of order one having probabilities which reflect a transition of said mode information.

* * * * *